US006242088B1

(12) United States Patent
Costa

(10) Patent No.: US 6,242,088 B1
(45) Date of Patent: Jun. 5, 2001

(54) METHOD FOR PRODUCING A LAMINATED GLASS PANE FREE OF OPTICAL OBSTRUCTION CAUSED BY WARPING, USE OF A PARTICULAR CARRIER FILM FOR THE PRODUCTION OF THE LAMINATED GLASS PANE AND CARRIER FILMS PARTICULARLY SUITABLE FOR THE METHOD OR THE USE

(75) Inventor: Peter Costa, Witten (DE)

(73) Assignee: Pilkington Automotive Deurschland GmbH (DE)

( * ) Notice: Subject to any disclaimer, the term of this patent is extended or adjusted under 35 U.S.C. 154(b) by 0 days.

(21) Appl. No.: 09/043,366

(22) PCT Filed: Sep. 13, 1996

(86) PCT No.: PCT/EP96/04018

§ 371 Date: Jul. 31, 1998

§ 102(e) Date: Jul. 31, 1998

(87) PCT Pub. No.: WO97/10099

PCT Pub. Date: Mar. 20, 1997

(30) Foreign Application Priority Data

Sep. 16, 1995 (DE) .............................................. 195 34 420

(51) Int. Cl.$^7$ ..................................................... B32B 31/00
(52) U.S. Cl. ......................... 428/339; 156/102; 156/106; 428/332
(58) Field of Search ............................. 156/99, 102, 106; 428/332, 339

(56) References Cited

U.S. PATENT DOCUMENTS

| Re. 28,883 | | 6/1976 | Willdorf . | |
|---|---|---|---|---|
| 3,868,286 | * | 2/1975 | Fariss et al. | 156/163 |
| 3,891,486 | | 6/1975 | Willdorf . | |
| 4,465,736 | | 8/1984 | Nishihara et al. . | |
| 4,799,745 | | 1/1989 | Meyer et al. . | |
| 5,071,206 | | 12/1991 | Hood et al. . | |
| 5,238,743 | | 8/1993 | Grolig et al. . | |

FOREIGN PATENT DOCUMENTS 0 457 209    11/1991    (EP) .

* cited by examiner

*Primary Examiner*—Francis J. Lorin
(74) *Attorney, Agent, or Firm*—Marshall & Melhorn, LLC

(57) ABSTRACT

The invention relates to a method for producing a laminated glass pane free of optical obstruction, caused by warping, in reflected and transmitted light. The laminated glass pane comprises a first pane of glass, a second pane of glass and a multilayer spacer layer comprising a first composite film, a biaxially-stretched, thermoplastic carrier film provided with a thin layer system, and a second composite film. A carrier film provided with the thin layer system is mounted on the first composite film and has a thickness of from 30 to 70 μm and a degree of heat shringage of from 0.3 to 0.8%, measured after a heat treatment of 20 seconds at 120° C., in both directions. The second composite film is mounted on the carrier film. The packet of films is arranged between the two panes of glass so as to be wrinkle-free, pressed using pressure and heat and made into a composite with the panes of glass. A suitable carrier film and the use thereof for producing the laminated pane of glass are also disclosed.

17 Claims, No Drawings

METHOD FOR PRODUCING A LAMINATED GLASS PANE FREE OF OPTICAL OBSTRUCTION CAUSED BY WARPING, USE OF A PARTICULAR CARRIER FILM FOR THE PRODUCTION OF THE LAMINATED GLASS PANE AND CARRIER FILMS PARTICULARLY SUITABLE FOR THE METHOD OR THE USE

BACKGROUND OF THE INVENTION

The invention relates to a process for the manufacture of a laminated safety glass pane which in reflected and transmitted light is free from wrinkle-related optical distortions, comprising a first glass pane, a second glass pane and a multi-layer intermediate layer, which intermediate layer in the form of a foil laminate consists of a first laminating foil, a bi-axially stretched thermoplastic carrier foil provided with a thin-film system, and a second laminating foil. The invention furthermore relates to the use of a carrier foil for the manufacture of the laminated safety glass pane as well as to a carrier foil particularly suitable for the process and the use respectively. The laminated safety glass panes may be either flat or curved panes. The flat laminated safety glass panes are used for a great variety of applications, e.g. in the building industry or as side windows of motor vehicles. The term curved laminated safety glass panes denotes, within the framework of the invention, singly curved and, in particular, double curved (spherically bent) laminated safety glass panes, and also so-called complex curved laminated safety glass panes, which at least in some parts have large curvatures, i.e. small radii of curvature. Complex curved laminated safety glass panes are used, in particular, as windscreens or rear windows of motor vehicles.

With the described laminated safety glass panes the thin-film system forms a so-called functional layer. This serves to produce the laminated safety glass panes in such a way that they can fulfil other functions. These functions include, among others, the heatability, the changing of the light and energy transmission degree and reflectance respectively, and the fitting with antennas for the most varying uses. The structure of the thin-film systems and the production thereof are known and proven. Particularly suitable are thin-film systems based on silver layers or semiconductive metal oxide layers. These thin-film systems are integrated into the laminated safety glass pane with the aid of a transparent thermoplastic carrier. With regard to the state of the art reference is made in so far, for example, to the WO 90/08334, which describes known carrier foils, proven thin-film systems and also customary laminating foils.

Laminated safety glass panes of the type described at the outset often display optical distortions, in particular in reflected light. These optical distortions are caused by phenomena that can be attributed to corrugations in the carrier foils. The optical distortions occur in flat laminated safety glass panes of the described type as well as in curved, especially complex curved laminated safety glass panes.

The known measures from which the invention proceeds (EP 0 077 672) relate to a selectively light-transmitting or electrically conductive film on a carrier foil, which has a thickness between 12 and 125 µm and after a heat treatment at 120° C. for 30 minutes displays a heat shrinkage which depends in a complicated manner on the thickness of the carrier foil. This serves to avoid optical distortions in a laminated safety glass pane, in which the carrier foil is integrated with the thin-film system. Also here the laminated safety glass pane may be flat or curved. Tests have shown that the results that can be obtained according to these teaching are open to criticism. The problems described at the outset, which occur with flat as well as with complex curved laminated safety glass panes, especially in the case of small radii of curvature, are not dealt with.

To prevent that a carrier foil provided with a thin-film system, in particular one of polyethylene terephthalate, which is integrated in a laminated safety glass pane of the type described at the outset, during the manufacture of the laminated safety glass pane changes its properties and as a result thereof causes optical distortions, it is known (EP 0 457 209 A2) to bi-axially stretch the carrier foil at temperatures above the so-called glass temperature, followed by thermo-fixing, and after the thermo-fixing to carry out a further stretching at temperatures below the glass temperature. The measures known in this respect are complicated, the result is unsatisfactory. The problems mentioned at the outset are not dealt with.

The invention is based on the technical problem to indicate simple measures suitable for an industrial series production of the laminated safety glass pane, with which flat as well as curved laminated safety glass panes of the type described at the outset can be manufactured, which do not display optical distortions in reflected and/or transmitted light.

To solve this technical problem, the subject of the invention is the process according to patent claim 1.

The deaeration which belongs to the teachings of the invention is customary and necessary to avoid in the laminated safety glass pane distortions caused by air inclusions. The deaeration must take place effectively and adequately in respect of the laminated safety glass pane as a whole as well as in respect of the foil laminate consisting of laminating foils and carrier foils. The characteristic 1.2) is to be understood as meaning that the laminating technology customary in the manufacture of laminated safety glass is used. The process step according to characteristic 1.1) includes the possibility of producing a pre-laminate of the first laminating foil and the carrier foil as well as, optionally, the second laminating foil. The foils that must be pre-laminated are in this case drawn off, in particular, from stock rolls and joined together using pressure and heat with a simultaneous or prior deaeration, before the pre-laminates produced in this manner are cut to size and placed between the two glass panes.

DETAILED DESCRIPTION OF THE PREFERRED EMBODIMENT

In detail, there exists within the framework of the invention several possibilities for carrying out the process according to the invention. According to a preferred embodiment of the invention a pre-laminate of the first laminating foil and the carrier foil is placed on the first glass pane, and then the second laminating foil is put onto this. This method of operation can be recommended when a second laminating foil is used which is not available on rolls, as is known from the use of laminating foils with anti-glare strip that are stretched according to the shape of windscreens. When curved laminated safety glass panes must be made, a pre-laminate will be applied on the concave side of the first glass pane. After applying the pre-laminate a pre-pressing can be carried out using pressure and heat and then the second laminating foil can be put on and pressed. It lies within the framework of the invention to work with a pre-laminate which comprises a first laminating foil, the carrier foil provided with the thin-film system and the second laminating foil. However, it is also possible to proceed in such a way that the first laminating foil, the carier foil and the second laminating foil are put onto the first glass pane and then the pressing of the complete laminate is carried out. When curved laminated safety glass panes must be produced, the first laminating foil will be applied on the concave side of the first glass pane. Although within the framework of the measures according to the invention it is recommended to work as described, when manufacturing curved laminated safety glass panes it is also possible to proceed the other way around and to apply the laminating foil or the pre-laminate onto the convex side of the first glass pane. Care must always be taken that during this application wrinkles are not already formed in a laminating foil or in the carrier foil.

With the process according to the invention distorting deformations in the carrier foil as well as a destruction of the thin-film system are avoided or suppressed. The invention proceeds from the discovery that the described optical distortions in reflected light can be attributed to wrinkles with amplitudes in the micrometre range. These wrinkles occur as a result of incorrect handling and when using unsuitable carrier foils within the framework of the usual laminating processes, also in particular during the required deaeration processes and when using pressure and heat to join the constituents of the laminated safety glass panes to one another. The risk of the formation of such wrinkles is particularly great when curved, in particular complex curved glass panes are made. If in the course of the manufacture of the laminated safety glass pane the carrier foil has wrinkles, this will be visible mainly when looking at the reflection.

Surprisingly, with the process according to the invention optical distortions in transmitted and, in particular, reflected light are avoided. The state of the art does not lead one to assume that the invention would achieve this, and this not only with regard to the manufacture of flat laminated safety glass panes, but also with regard to the manufacture of curved and complex curved laminated safety glass panes. This also applies when the complex curves are so large that curing the adaption of the carrier foil with the thin-film system to these curvatures, a considerable wrinkling could be expected. This applies, in principle, to all laminating foils that are commonly used for the manufacture of laminated safety glass panes and to all customary carrier foils with thin-film systems. As laminating foils, in particular foils based on polyvinyl butyral, ethylenevinyl acetate, polyurethane and polyvinyl chloride can be used, whereas suitable carrier foils consists, in particular, of polyesters and their derivatives, in particular of polyethylene terephthalates. Other materials for the carrier foil can be cellulose esters or acryl polymers as well as polycarbonates and polyvinyl fluorides. The materials must be selected such that they form a dimensionally stable substrate for the thin-film system, that they are compatible with the laminating foils and adhere to these sufficiently. In addition they have to withstand the laminating process without being damaged, be compatible with the thin-film system, transparent and UV-stable.

The carrier foil can easily be stretched in such a way that the indicated heat shrinkage properties are ensured prior to manufacturing the laminated safety glass panes. Suitable processes are known. For making the carrier foils suitable for the process according to the invention, the starting foils are stretched bi-axially by 1% and more at temperatures above the so-called glass temperature, subsequent to which the stretching is thermo-fixed. It is important to control the process for the application of the thin-film system in such a way that the carrier foil at most shrinks slightly, so that a shrinkage behavior according to the characteristic 1.12) is also still present after the coating and before the use within the framework of the process according to the invention. If need be, an adequate cooling of the carrier foil during the coating must be ensured, or the foil must be mechanically clamped in. Surprisingly, the stretching of the carrier foil in both directions required to ensure the heat shrinkage according to characteristic 1.12) does not cause double refraction effects in the completed laminated safety glass panes. According to a preferred embodiment of the invention, a carrier foil provided with the thin-film system, the heat shrinkage degree of which according to characteristic 1.12) lies in the range of 0.3 to 0.6%, is placed on the laminating foil. The individual glass panes of the laminated safety glass pane according to the invention have the usual thicknesses. They may consist of normally cooled or chemically or thermally pre-stressed glass. Also partially pre-stressed glass panes can be used.

The described effects, essential to the invention, are obtained with normal thicknesses of the laminating foils. These lie in the range of 0.38 mm or a multiple thereof Preferably, a carrier foil with a thickness of 40 to 60 $\mu$m, preferably approximately 50 $\mu$m, is placed on the first laminating foil. Depending on the materials used and the temperatures and pressing times during the pressing, special measures that ensure the bonding between the laminating foils and the carrier foil are not necessary. A particularly thorough bonding in this foil laminate is obtained, however, when a carrier foil provided with the thin-film system, which on both surfaces has a surface energy of at least 40 mJ/m$^2$, is placed on the first laminating foil. To this end the carrier foil can be subjected on the uncoated side to, for example, a corona or plasma treatment.

The indicated value parameters are particularly advantageous and largely optimal when laminating foils of polyvinyl butyral (PVB) or ethylenevinyl acetate copolymers (EVA) and with a carrier foil of polyethylene terephthalate (ET) are used. The pressing according to characteristic 1.2) will normally be carried out at a temperature in the range of 120 to 130° C., at a pressure of up to 13 bar. Attention is drawn once again to the deaeration which is always required prior to producing a laminate or pre-laminate. The deaeration can take place with the usual means such as link rollers, a vacuum bag or vacuum lips.

According to the invention specially prepared carrier foils provided with the thin-film system are used for a special purpose, i.e. for the manufacture of laminated safety glass panes that are free from wrinkle-related optical distortions, in particular curved and complex curved laminated safety glass panes. This is possible because of the measures 1.11), 1.12) which are significant for the invention. This also applies to the described pre-laminates (duplet/triplet). The described and claimed use can also take place in the form of the pre-laminates which consist of a laminating foil and the carrier foil as well as, optionally, the second laminating foil. When curved and, in particular, complex curved laminated safety glass panes are manufactured, the foil systems, in addition to the influences of pressure and temperature, are subjected to external forces which ensure the adaptation of the originally flat foils of the foil system to the single or double curvature of the laminated safety glass panes that are to be produced. When manufacturing curved laminated safety glass panes with a double curvature, these forces produce, so to speak, compression phenomena. This applies, in particular, when manufacturing complex curved laminated safety glass panes. In addition there are the deformations from internal forces which the foils of the foil systems, so to speak, bring with them. When manufacturing curved laminated safety glass panes with a single curve, these forces may cause thrust phenomena, and also here there are the additional influences of the internal forces. The situation is similar when manufacturing flat laminated safety glass panes. Surprisingly, the teachings of the invention in all cases solve the technical problem that forms the basis of the invention. This also applies when additional mechanical influences (formation of air flow channels) occur during the deaeration.

The invention also covers carrier foils which are particularly suitable for the described process and the described use, respectively. These carrier foils form the subject of patent claims 15 to 19.

In the following the invention will be explained in greater detail with reference to an exemplified embodiment. The exemplified embodiment relates, without limitation, to the manufacture of complex curved laminated safety glass panes.

An 0.38 mm thick PVB laminating foil of the firm Monsanto, grained on both sides, a PET carrier foil with a highly light-permeable sun protection film with a double silver layer (product designation XIR 75) of the firm Southwall, as well as a second 0.38 mm thick laminating foil of the firm Monsanto, grained on both sides, were drawn off from rolls and joined together at about 60 to 70° C. between a pair of rollers, to form a deaerated and partially glued pre-laminate, which next was cut to the required dimensions.

Prior to the coating, the PET carrier foil had been bi-axially stretched and thermo-fixed. The stretching and coating had taken place under such conditions that the PET carrier foil, after the coating and prior to the manufacture of the pre-laminate, displayed the folowing heat shrinkage behaviour. During a 20 second immersion in a liquid bath of polyethylene glycol (molecular weight about 400), heated to 120° C., the coated PET carrier foil shrunk by about 0.4% in the foil plane parallel and perpendicular to the longitudinal stretching. The measuring took place by clamping both ends of a foil strip with a length of 150 mm and a width of 15 mm between the jaws of a length measuring device. The length of the foil strip is measured prior to the immersion in the temperature bath and on completion of the heat treatment, at the same starting temperature. From this the percentage of the change in length is calculated as the shrinkage value at a given shrinking temperature and dwell time.

The coated PET carrier foil, to ensure an adequate adhering to the laminating foil, had a surface energy on both sides of more than 40 mJ/m$^2$.

The pre-laminate produced as described was placed free from wrinkles on the concave side of a complex curved glass pane with a thickness of 2.1 mm. The glass pane was curved in the longitudinal as well as in the transverse direction and had sharply curved side pails. Along its edge it was provided with a printed on and burned in opaque anti-glare strip. Then a second complex curved glass pane, with a thickness of 1.5 mm, the curving of which corresponded to that of the first glass pane, was placed on the pre-laminate. The edges of the pre-laminate sticking out over the edges of the glass panes were cut off. Around the edge of the pane, as generally known from the manufacture of curved laminated safety glass, a lip profile was provided connected to a vacuum system for the purpose of the deaeration.

During the subsequent deaeration process, a vacuum was applied to the lip profile for about 20 minutes, and by doing so the glass-foil pack was deaerated. Next, whilst maintaining the vacuum, it was pre-laminated in an autoclave with the aid of a heat treatment of about half an hour at a maximum temperature of approximately 100° C. This was followed, after an interim cooling, by the actual laminating process in an autoclave with a heating of the pre-laminated glass-foil pack to about 125° C. and a pressure treatment at up to 13 bar.

After removing it from the autoclave, the reflection and transmission optics of the completed laminated safety glass were checked. Also in the area of the more sharply curved side parts of the glass pane, the coated PET carrier foil was practically wrinkle-free and the glass pane met the stringent requirements on windscreens or rear windows of motor vehicles in respect of safety properties and reflection/transmission optics.

Comparison tests with coated carrier foils, the heat shrinkage behaviour of which was clearly outside the range claimed by the invention, which therefore during a heat treatment at 120° C. for 20 seconds shrunk by less than 0.3%, did not result in laminated safety glass which was free from optical distortions, which in particular became noticeable by a bothersome wash-board effect in the reflection optics of the glass panes. When using carrier foils which clearly shrank by more than 0.8%, the so-called orange peel skin effect was observed, which occurs as a result of the formation of irregular elevations and depressions in the carrier foil. Also tests with carrier foils outside the claimed thickness range did not, on the whole, lead to satisfactory results.

What is claimed is:

1. A process for the manufacture of a laminated safety glass pane which in reflected and/or transmitted light is free from wrinkle-related optical distortions, comprising a first glass pane, a corresponding second glass pane and a multi-layer intermediate layer, which intermediate layer in the form of a foil laminate consists of a first laminating foil, a bi-axially stretched thermoplastic carrier foil provided with a thin-film system, and a second laminating foil, with the characteristics:

1.1) Placed on the first laminating foil is a carrier foil provided with the thin-film system, which
      1.11) has a thickness of 30 to 70 $\mu$m and
      1.12) in both stretching directions displays a heat shrinkage degree of 0.3 to 0.8%, measured after a heat treatment of 20 seconds at 120° C.,
   and the second laminating foil is placed on the carrier foil,
   1.2) the foils according to characteristic 1.1) are arranged wrinkle-free between the two glass panes and pressed, using pressure and heat, as well as joined to the glass panes, wherein within the framework of the measures according to 1.1) and/or 1.2) at least one deaeration is carried out.

2. A process according to claim 1, wherein on the first glass pane a pre-laminate consisting of the first laminating foil and the carrier foil is placed and the second laminating foil is placed the prilaminate.

3. A process according to claim 2, wherein after applying the pre-laminate, a pre-pressing is carried out using pressure and heat, and subsequently the second laminating foil is put on and pressed.

4. A process according to claim 1, wherein onto the first glass pane the first laminating foil, the carrier foil and the second laminating foil, a pre-laminate of these foils is applied and subsequently the pressing is carried out.

5. A process according to claim 1, wherein on the first laminating foil a carrier foil provided with the thin-film system is placed, the heat shrinkage degree of which according to characteristic 1.12) and 2.12) respectively lies in the range of 0.3 to 0.6%.

6. A process according to claim 1, wherein on the first laminating foil a carrier foil is placed, which has a thickness of 40 to 60 μm, preferably approximately 50 μm.

7. A process according to claim 1, wherein on the first laminating foil a carrier foil provided with the thin-film system is placed, which on both surfaces has a surface energy of at least 40 mJ/m$^2$.

8. A process according to claim 1, wherein laminating foils are used based on polyvinyl butyral or ethylenevinyl acetate and a carrier foil of polyethylene terephthalate.

9. A process according to claim 1 wherein the pressing according to characteristic 1.1) is carried out at a temperature in the range of 115 to 135° C. with a pressure of maximum 13 bar.

10. Use of a carrier foil of stretched thermoplastic plastic provided with a thin-film system, which carrier foil has a thickness of 30 to 70 μm as well as a bi-axial stretching, for the manufacture of laminated safety glass panes, in particular for the manufacture of laminated safety glass panes which in reflected and/or transmitted light are free from wrinkle-related optical distortions, comprising a first glass pane, a corresponding second glass pane and a multi-layer intermediate layer in the form of a foil laminate consisting of a first laminating foil, the bi-axially stretched carrier foil and a second laminating foil, characterised in that the carrier foil in both stretching directions displays a heat shrinkage degree of 0.3 to 0.8%, measured after a heat treatment of 20 seconds at 120° C.

11. Use according to claim 10 wherein the heat shrinkage degree of the carrier foil lies in the range of 0.3 to 0.6%.

12. Stretched carrier foil of thermoplastic plastic provided with a thin-film system for carrying out the process according to claim 1, which has a thickness of 30 to 70 μm and in both stretching directions a heat shrinkage degree of 0.3 to 0.8%, measured after a heat treatment of 20 seconds at 120° C.

13. Stretched carrier foil of thermoplastic plastic provided with a thin-film system for the use according to claim 10, which has a thickness of 30 to 70 μm and in both stretching directions a heat shrinkage degree of 0.3 to 0.8%, measured after a heat treatment of 20 seconds at 120° C.

14. Stretched carrier foil according to claim 10, which has a thickness of 40 to 60 μm.

15. Stretched carrier foil according to claim 12, which on both surfaces has a surface energy of at least 40 mJ/m$^2$.

16. Stretched carrier foil according to claim 12, which comprises polyethylene terephthalate.

17. Stretched carrier foil according to claim 14, which has a thickness of approximately 50 μm.

* * * * *